United States Patent
Reed et al.

(10) Patent No.: US 11,055,805 B1
(45) Date of Patent: Jul. 6, 2021

(54) UTILIZING DEPENDENCY BETWEEN WATERMARK VISIBILITY AND LOCATION OF IMAGE SAMPLE IN COLOR SPACE FOR EMBEDDED SIGNAL COLOR DIRECTION

(71) Applicant: Digimarc Corporation, Beaverton, OR (US)

(72) Inventors: Alastair M. Reed, Lake Oswego, OR (US); Kristyn R. Falkenstern, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 16/681,773

(22) Filed: Nov. 12, 2019

Related U.S. Application Data

(60) Provisional application No. 62/758,365, filed on Nov. 9, 2018.

(51) Int. Cl.
*G06T 1/00* (2006.01)

(52) U.S. Cl.
CPC ............ *G06T 1/005* (2013.01); *G06T 1/0028* (2013.01); *G06T 2201/0053* (2013.01); *G06T 2201/0061* (2013.01)

(58) Field of Classification Search
CPC .................. G06T 1/005; G06T 1/0028; G06T 2201/0061; G06T 2201/0053
See application file for complete search history.

(56) References Cited

U.S. PATENT DOCUMENTS

| | | | |
|---|---|---|---|
| 5,862,260 A | 1/1999 | Rhoads | |
| 6,122,403 A | 9/2000 | Rhoads | |
| 6,345,104 B1 | 2/2002 | Rhoads | |
| 6,408,082 B1 | 6/2002 | Rhoads | |
| 6,449,377 B1 | 9/2002 | Rhoads | |
| 6,590,996 B1 | 7/2003 | Reed | |
| 6,614,914 B1 | 9/2003 | Rhoads | |
| 6,625,297 B1 | 9/2003 | Bradley | |
| 6,674,876 B1 | 1/2004 | Hannigan | |
| 6,718,046 B2 | 4/2004 | Reed | |
| 6,763,123 B2 | 7/2004 | Reed | |
| 6,891,959 B2 | 5/2005 | Reed | |
| 6,912,295 B2 | 6/2005 | Reed | |
| 6,947,571 B1 | 9/2005 | Rhoads | |
| 6,988,202 B1 | 1/2006 | Rhoads | |
| 7,072,490 B2 | 7/2006 | Stach | |
| 7,076,082 B2 | 7/2006 | Sharma | |
| 7,352,878 B2 | 4/2008 | Reed | |

(Continued)

FOREIGN PATENT DOCUMENTS

| | | |
|---|---|---|
| WO | 9953428 | 10/1999 |
| WO | 0007356 | 2/2000 |

OTHER PUBLICATIONS

A. Reed, D. Berfanger, Y. Bai, and K. Falkenstern, "Full-color visibility model using CSF which varies spatially with local luminance", SPIE Proc. Imaging and Multimedia Analytics in a Web and Mobile World 2014, vol. 9027, pp. 902705-902705-12, San Francisco, Feb. 2014.

(Continued)

*Primary Examiner* — Christopher Wait

(74) *Attorney, Agent, or Firm* — Digimarc Corporation

(57) ABSTRACT

The present disclosure relates generally to signal encoding for printed objects. One implementation selects an embed direction based on a minimal visibility axis of a 1 JND ellipse at a certain color center. Other technology provided.

26 Claims, 10 Drawing Sheets

(56) References Cited

U.S. PATENT DOCUMENTS

| | | |
|---|---|---|
| 7,412,072 B2 | 8/2008 | Sharma |
| 7,747,656 B2 | 6/2010 | Kudo |
| 7,986,807 B2 | 7/2011 | Stach |
| 9,117,268 B2 | 8/2015 | Reed |
| 9,182,778 B2 | 11/2015 | Sharma |
| 9,380,186 B2 | 6/2016 | Reed |
| 9,401,001 B2 | 7/2016 | Reed |
| 9,449,357 B1 | 9/2016 | Lyons |
| 9,565,335 B2 | 2/2017 | Reed |
| 9,635,378 B2 | 4/2017 | Holub |
| 9,747,656 B2 | 8/2017 | Stach |
| 9,922,220 B2 | 3/2018 | Evans |
| 1,021,718 A1 | 2/2019 | Holub |
| 1,038,264 A1 | 8/2019 | Bai Yang |
| 2006/0165311 A1 | 7/2006 | Watson |
| 2010/0150434 A1 | 6/2010 | Reed |
| 2012/0078989 A1 | 3/2012 | Sharma |
| 2013/0329006 A1 | 12/2013 | Boles |
| 2015/0030201 A1 | 1/2015 | Holub |
| 2015/0156369 A1 | 6/2015 | Reed |
| 2015/0187039 A1 | 7/2015 | Reed |

OTHER PUBLICATIONS

A. Watson and D. Pelli, "Quest: A Bayesian adaptive psychometric method", Attention, Perception & Psychophysics, vol. 33, No. 2, pp. 113-120, 1983.

G. Johnson and M. Fairchild, "A top down description of S-CIELAB and CIEDE2000", Color Research and Application, vol. 28, Issue 6, pp. 425-430, 2003.

Q. Xu, Q. Zhai, M. R. Luo, H. Gu, and D. Sekulovski, "A Study of Visible Chromatic Contrast Threshold Based on Different Color Directions and Spatial Frequencies," Proc. 26th IS&T Color Imaging Conference, pp. 53-58, 2018.

Reed, Falkenstern, Hattenberger, "Selecting Best Ink Color for Sparse Watermark," Electronic Imaging, Color Imaging XXII: Displaying, Processing, Hardcopy, and Applications, pp. 130-136(7), 2017.

Reed, Kitanovski, Falkenstern and Pedersen, "Using watermark visibility measurements to select an optimized pair of spot colors for use in a binary watermark," Electronic Imaging, Color Imaging XXV: Displaying, Processing, Hardcopy, and Applications, pp. 197-1-197-7(7), 2020.

U.S. Appl. No. 62/758,365, filed Nov. 9, 2019. 86 pgs.

V. Kitanovski, A. Reed, K. Falkenstern, M. Pedersen, "Measurement of CIELAB spatio-chromatic contrast sensitivity in different spatial and chromatic directions," 27th Color and Imaging Conference Final Program and Proceedings, Society for Imaging Science and Technology, pp. 326-330, 2019.

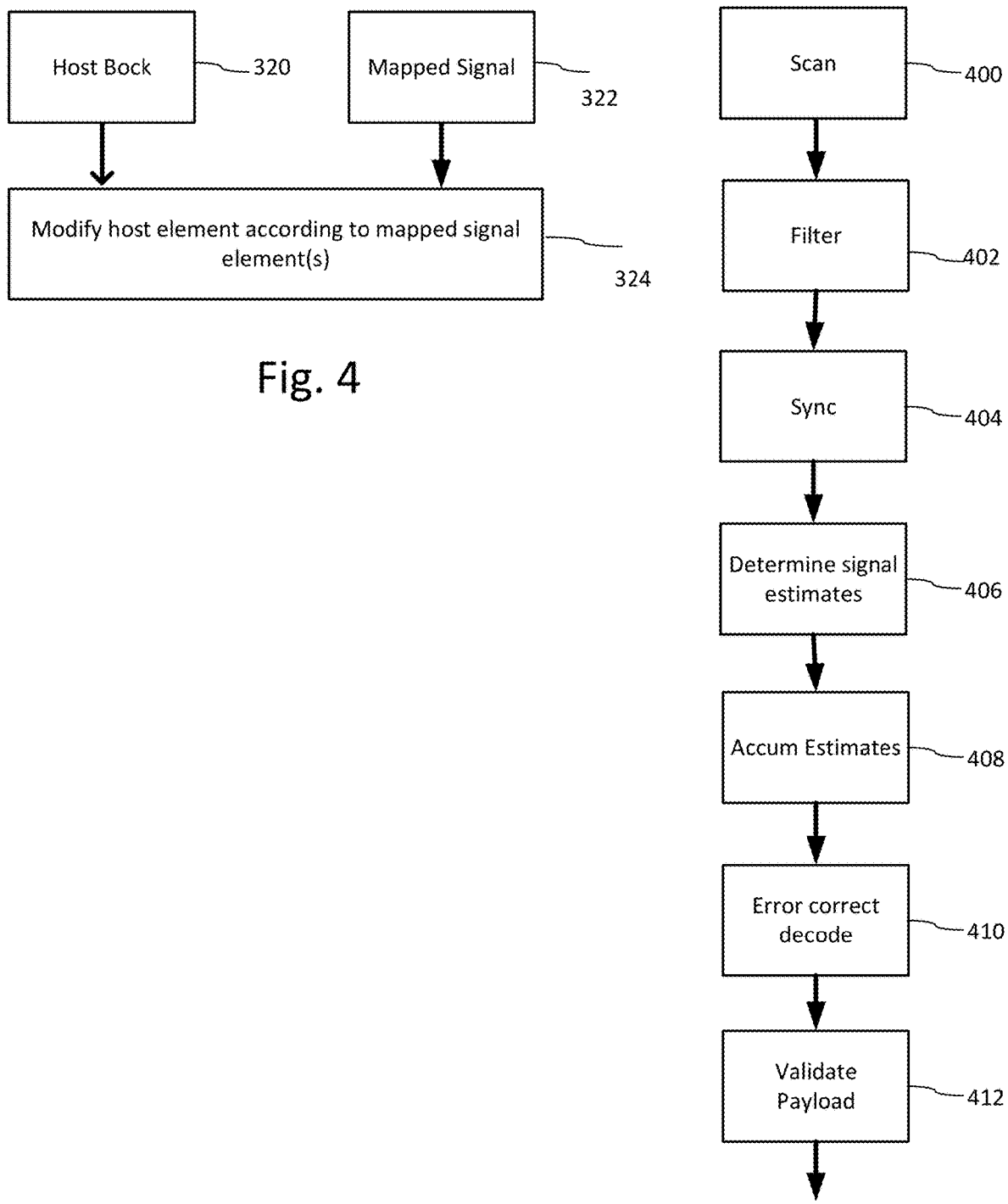

Fig. 6
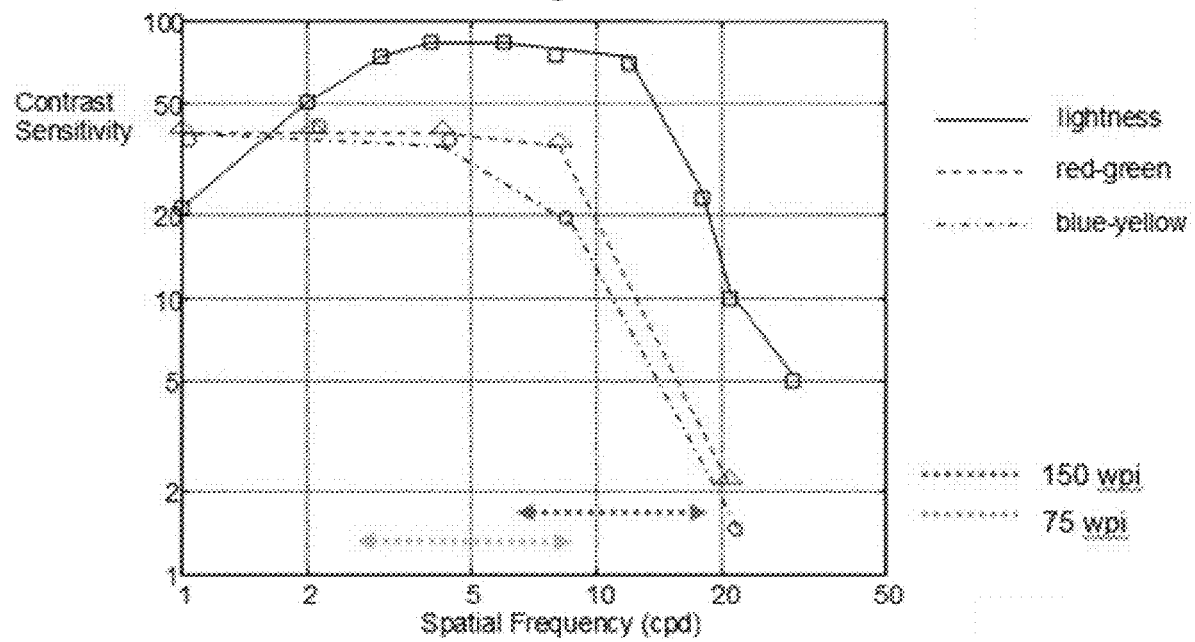
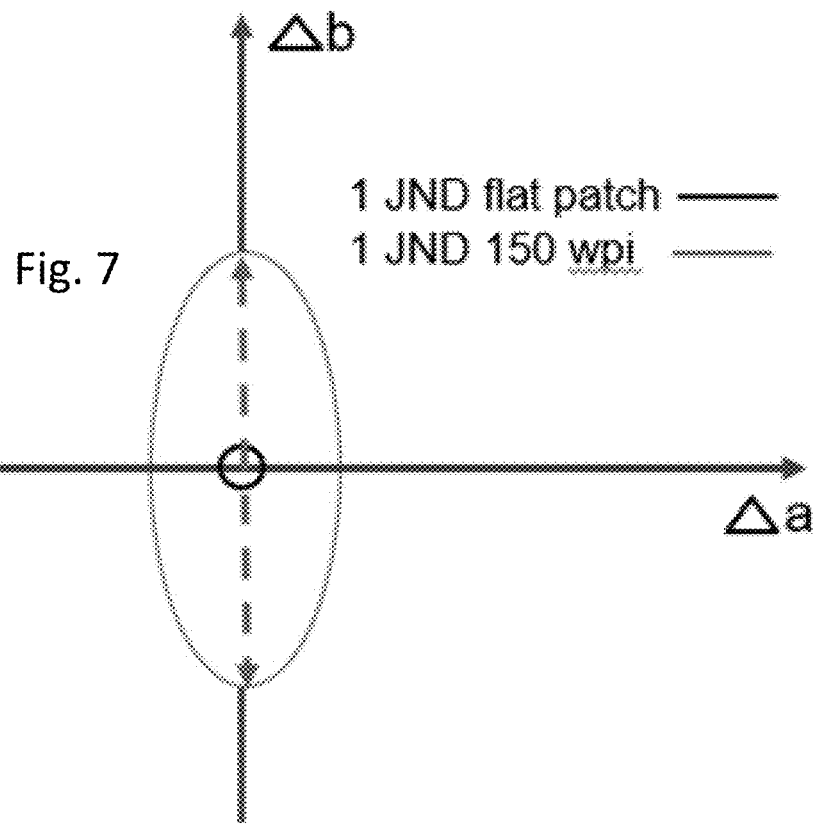
Fig. 7

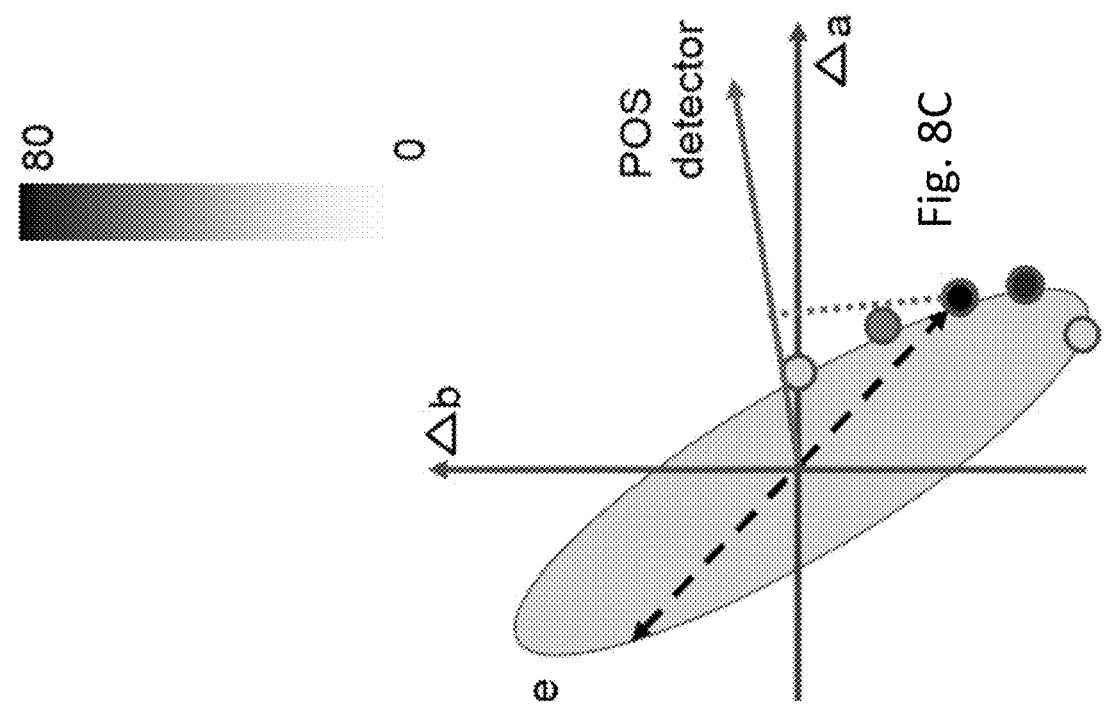
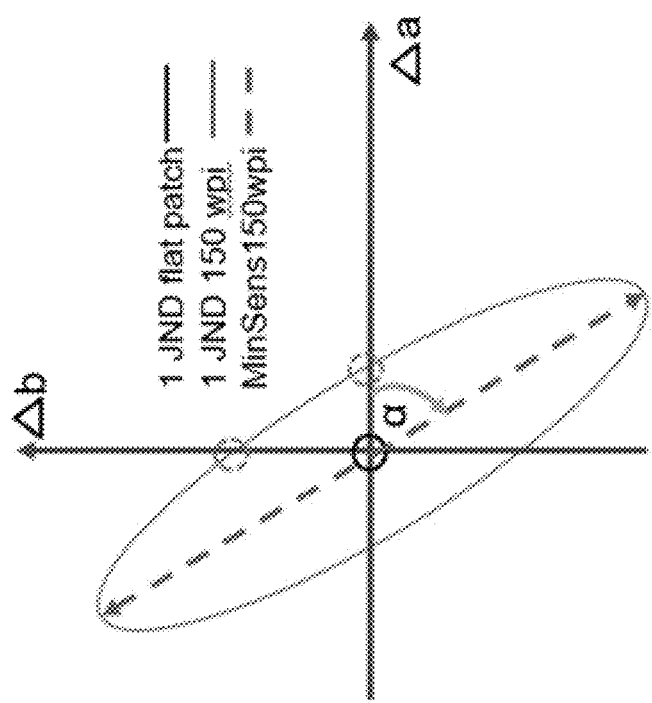
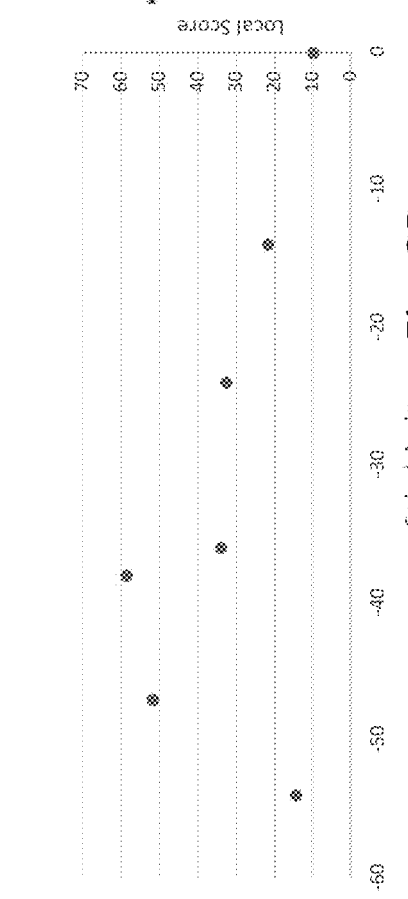

UTILIZING DEPENDENCY BETWEEN WATERMARK VISIBILITY AND LOCATION OF IMAGE SAMPLE IN COLOR SPACE FOR EMBEDDED SIGNAL COLOR DIRECTION

RELATED APPLICATION DATA

This application claims the benefit of assignee's U.S. Provisional Patent Application No. 62/758,365, filed Nov. 9, 2019, which is hereby incorporated herein by reference in its entirety.

TECHNICAL FIELD

The present disclosure relates generally to advanced image signal processing, color science, signal encoding and digital watermarking, particularly for printed objects including, e.g., product packaging, labels and hangtags.

BACKGROUND AND SUMMARY

This document describes technology to encode information signals in host carriers, such as color artwork and images. One form of information encoding is "steganography." Another form of information encoding includes digital watermarking. For purposes of this disclosure, the terms "digital watermark," "watermark" and "data hiding" are used interchangeably. We sometimes use the terms "encoding," "encode," "embedding," "embed," and "data hiding" to mean modulating or transforming data representing imagery or video to include information therein. For example, data encoding embeds an information signal (e.g., a plural bit payload or a modified version of such, e.g., a 2-D error corrected, spread spectrum signal) in a host signal. This can be accomplished, e.g., by modulating a host signal (e.g., image, video or audio) in some fashion to carry the information signal. One way to modulate a host signal is to overprint a first color with additional colors. Another way to modulate a host signal is to tweak (or adjust) an ink value relative to its original value.

Some of the present assignee's work in signal encoding, data hiding and digital watermarking is reflected, e.g., in U.S. Pat. Nos. 6,947,571; 6,912,295; 6,891,959, 6,763,123; 6,718,046; 6,614,914; 6,590,996; 6,408,082; 6,122,403 and 5,862,260, and in published specifications WO 9953428 and WO 0007356 (corresponding to U.S. Pat. Nos. 6,449,377 and 6,345,104). Each of these patent documents is hereby incorporated by reference herein in its entirety. Of course, a great many other approaches are familiar to those skilled in the art. The artisan is presumed to be familiar with a full range of literature concerning signal encoding, steganography, data hiding and digital watermarking.

The described technology provides apparatus, systems, methods and non-transitory computer readable medium to encode a signal within artwork, along an optimal embed direction. The artwork may represent, e.g., product packaging, hang tags, etc.

One aspect of the disclosure is an image processing method comprising: collecting chromatic contrast sensitivity data gathered from observation of an encoded signal, the data representing multiple color encoding angles; from the data, generating a 1 Just Noticeable Difference (JND) ellipse around a first color center; from the ellipse, determining a signal encode direction, the signal encode direction comprising an angle α representing a negative angle between the 'a*' axis in an CIELAB space and a direction of minimum sensitivity of an encoded signal; and transforming color artwork to include an encoded signal, said transforming utilizing the angle α.

Additional features, aspects combinations and technology will be readily apparent from the following description with reference to the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4 is a diagram illustrating embedding of an auxiliary signal into host image signal.

FIG. 5 is a flow diagram illustrating a method for decoding a payload signal from a host image signal.

FIG. 6 is a plot showing a 150 wpi frequency relative to contrast sensitivity curves.

FIG. 7 is a plot showing a 1 JND ellipse, with embedding in the Ab direction.

FIGS. 8A-8C are diagrams showing a 1 JND ellipse with a minimum visibility having an angle α off of the 'Δa' direction.

DETAILED DESCRIPTION

Introduction

The following detailed description is divided into three (3) general sections. It should be understood from the outset, however, that we expressly contemplate combining subject matter from one such section with one or more of the other sections, Thus, the sections and section headings are provided for the reader's convenience and are not intended to impose restrictions or limitations. The sections include: I. Signal Encoder and Decoder; II. Determining a candidate color direction for embedding; and III. Operating Environments.

I. Signal Encoder and Decoder

Encoder/Decoder

Figure 1:
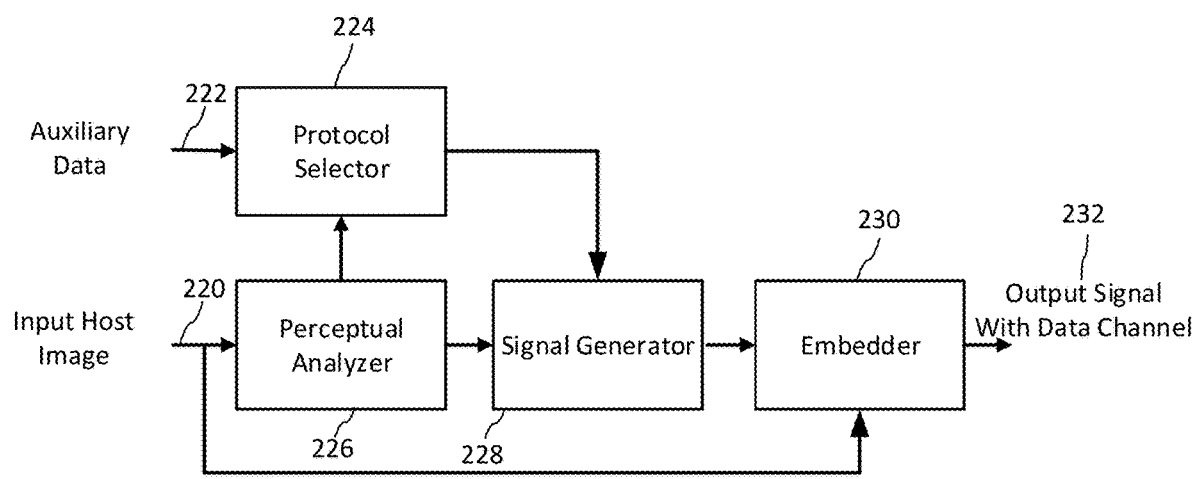
FIG. 1 is a block diagram of a signal encoder for encoding a digital payload signal into an image signal.
Figure 2:
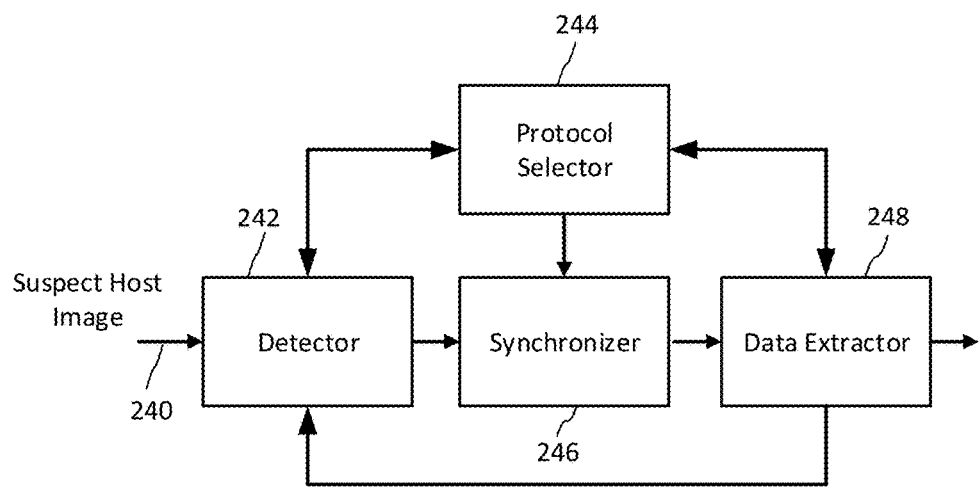
FIG. 2 is a block diagram of a compatible signal decoder for extracting the digital payload signal from an image signal.

FIG. 1 is a block diagram of a signal encoder for encoding a digital payload signal into an image signal. FIG. 2 is a block diagram of a compatible signal decoder for extracting the digital payload signal from an image signal.

While the signal encoder and decoder may be used for communicating a data channel for many applications, one objective for use in physical objects is robust signal communication through images formed on and captured from these objects. Signal encoders and decoders, like those in the Digimarc Barcode Platform from Digimarc Corporation, communicate auxiliary data in a data carrier within image content. Encoding and decoding is applied digitally, yet the signal survives digital to analog transformation and analog to digital transformation. For example, the encoder generates a modulated digital image that is converted to a rendered form, such as a printed image. The modulated digital image includes the encoded signal prior to rendering. Prior to decoding, a receiving device has or communicates with an imager to capture the modulated signal, convert it to an electric signal, which is digitized and then processed by the FIG. 2 signal decoder.

Inputs to the signal encoder include a host image 220 and auxiliary data payload 222. The objectives of the encoder include encoding a robust signal with desired payload capacity per unit of host signal (e.g., a unit may include the spatial area of a two-dimensional tile within the host signal), while maintaining perceptual quality. In some cases, there may be very little variability or presence of a host signal. In this case, there is little host interference on the one hand, yet little host content in which to mask the presence of the data channel within an image. Some examples include a package design that is devoid of much image variability (e.g., a single, uniform color), See, e.g., Ser. No. 14/725,399, issued as U.S. Pat. No. 9,635,378, incorporated herein by reference in its entirety.

The auxiliary data payload 222 includes the variable data information to be conveyed in the data channel, possibly along with other protocol data used to facilitate the communication. The protocol of the auxiliary data encoding scheme comprises the format of the auxiliary data payload, error correction coding schemes, payload modulation methods (such as the carrier signal, spreading sequence, encoded payload scrambling or encryption key), signal structure (including mapping of modulated signal to embedding locations within a tile), error detection in payload (CRC, checksum, etc.), perceptual masking method, host signal insertion function (e.g., how auxiliary data signal is embedded in or otherwise combined with host image signal in a package or label design), and/or synchronization method and signals.

The protocol defines the manner in which the signal is structured and encoded for robustness, perceptual quality and/or data capacity. For a particular application, there may be a single protocol, or more than one protocol, depending on application requirements. Examples of multiple protocols include cases where there are different versions of the channel, different channel types (e.g., several digital watermark layers within a host). Different versions may employ different robustness encoding techniques or different data capacity. Protocol selector module 224 determines the protocol to be used by the encoder for generating a data signal. It may be programmed to employ a particular protocol depending on the input variables, such as user control, application specific parameters, or derivation based on analysis of the host signal.

Perceptual analyzer module 226 analyzes the input host signal to determine parameters for controlling signal generation and embedding, as appropriate. It is not necessary in certain applications, while in others it may be used to select a protocol and/or modify signal generation and embedding operations. For example, when encoding in host color images that will be printed or displayed, the perceptual analyzer 256 is used to ascertain color content and masking capability of the host image. The output of this analysis, along with the rendering method (display or printing device) and rendered output form (e.g., ink and substrate) is used to control auxiliary signal encoding in particular color channels (e.g., one or more channels of process inks, Cyan, Magenta, Yellow, or Black (CMYK) or spot colors), perceptual models, and signal protocols to be used with those channels. Please see, e.g., our work on visibility and color models used in perceptual analysis in our U.S. application Ser. No. 14/616,686 (published as US 2015-0156369 A1; issued as U.S. Pat. No. 9,380,186), Ser. No. 14/588,636 (published as US 2015-0187039 A1; issued as U.S. Pat. No. 9,401,001) and Ser. No. 13/975,919 (issued as U.S. Pat. No. 9,449,357), Patent Application Publication No. US 2010-0150434 A1, and U.S. Pat. No. 7,352,878, which are hereby incorporated by reference in their entirety.

The perceptual analyzer module 226 also computes a perceptual model, as appropriate, to be used in controlling the modulation of a data signal onto a data channel within image content as described below.

The signal generator module 228 operates on the auxiliary data and generates a data signal according to the protocol. It may also employ information derived from the host signal, such as that provided by perceptual analyzer module 226, to generate the signal. For example, the selection of data code signal and pattern, the modulation function, and the amount of signal to apply at a given embedding location may be, adapted depending on the perceptual analysis, and in particular on the perceptual model and perceptual mask that it generates. Please see below and the incorporated patent documents for additional aspects of this process.

Embedder module 230 takes the data signal and modulates it into an image by combining it with the host image. The operation of combining may be an entirely digital signal processing operation, such as where the data signal modulates the host signal digitally, may be a mixed digital and analog process or may be purely an analog process (e.g., where rendered output images, with some signals being modulated data and others being host image content, such as the various layers of a package design file).

There are a variety of different functions for combining the data and host in digital operations. One approach is to adjust the host signal value as a function of the corresponding data signal value at an embedding location, which is limited or controlled according to the perceptual model and a robustness model for that embedding location. The adjustment may be altering the host image by adding a scaled data signal or multiplying by a scale factor dictated by the data signal value corresponding to the embedding location, with weights or thresholds set on the amount of the adjustment according to the perceptual model, robustness model, and/or available dynamic range. The adjustment may also be altering by setting the modulated host signal to a particular level (e.g., quantization level) or moving it within a range or bin of allowable values that satisfy a perceptual quality or robustness constraint for the encoded data.

As detailed further below, the signal generator 228 produces a data signal with data elements that are mapped to embedding locations in an image tile. These data elements are modulated onto the host image at the embedding locations. A tile may include a pattern of embedding locations. The tile derives its name from the way in which it is repeated in contiguous blocks of a host signal, but it need not be arranged this way. In image-based encoders, we may use tiles in the form of a two dimensional array (e.g., 128×128, 256×256, 512×512) of embedding locations. The embedding locations correspond to host signal samples at which an encoded signal element is embedded in an embedding domain, such as a spatial domain (e.g., pixels at a spatial resolution), frequency domain (frequency components at a frequency resolution), or some other feature space. We sometimes refer to an embedding location as a bit cell, referring to a unit of data (e.g., an encoded bit or chip element) encoded within a host signal at the location of the cell. Again, please see the documents incorporated herein for more information on variations for particular type of media.

The operation of combining may include one or more iterations of adjustments to optimize the modulated host for perceptual quality or robustness constraints. One approach, for example, is to modulate the host image so that it satisfies a perceptual quality metric as determined by perceptual model (e.g., visibility model) for embedding locations across the signal. Another approach is to modulate the host image so that it satisfies a robustness metric across the signal. Yet another is to modulate the host image according to both the robustness metric and perceptual quality metric derived for each embedding location. The incorporated documents provide examples of these techniques. Below, we highlight a few examples. See, e.g., U.S. Pat. No. 9,449,357; and see also, U.S. Pat. Nos. 9,401,001 and 9,565,335, which are each hereby incorporated by reference in its entirety.

For color images, the perceptual analyzer generates a perceptual model that evaluates visibility of an adjustment to the host by the embedder and sets levels of controls to govern the adjustment (e.g., levels of adjustment per color direction, and per masking region). This may include evaluating the visibility of adjustments of the color at an embedding location (e.g., units of noticeable perceptual difference in color direction in terms of CIE Lab values), Contrast Sensitivity Function (CSF), spatial masking model (e.g., using techniques described by Watson in US Published Patent Application No. US 2006-0165311 A1, which is incorporated by reference herein in its entirety), etc. One way to approach the constraints per embedding location is to combine the data with the host at embedding locations and then analyze the difference between the encoded host with the original. The perceptual model then specifies whether an adjustment is noticeable based on the difference between a visibility threshold function computed for an embedding location and the change due to embedding at that location. The embedder then can change or limit the amount of adjustment per embedding location to satisfy the visibility threshold function. Of course, there are various ways to compute adjustments that satisfy a visibility threshold, with different sequence of operations. See, e.g., our U.S. patent application Ser. Nos. 14/616,686, 14/588,636 and 13/975,919, Patent Application Publication No. US 2010-0150434 A1, and U.S. Pat. No. 7,352,878, already incorporated herein.

The Embedder also computes a robustness model. The computing of a robustness model may include computing a detection metric for an embedding location or region of locations. The approach is to model how well the decoder will be able to recover the data signal at the location or region. This may include applying one or more decode operations and measurements of the decoded signal to determine how strong or reliable the extracted signal. Reliability and strength may be measured by comparing the extracted signal with the known data signal. Below, we detail several decode operations that are candidates for detection metrics within the embedder. One example is an extraction filter which exploits a differential relationship to recover the data signal n the presence of noise and host signal interference. At this stage of encoding, the host interference is derivable by applying an extraction filter to the modulated host. The extraction filter models data signal extraction from the modulated host and assesses whether the differential relationship needed to extract the data signal reliably is maintained. If not, the modulation of the host is adjusted so that it is.

Detection metrics may be evaluated such as by measuring signal strength as a measure of correlation between the modulated host and variable or fixed data components in regions of the host or measuring strength as a measure of correlation between output of an extraction filter and variable or fixed data components. Depending on the strength measure at a location or region, the embedder changes the amount and location of host signal alteration to improve the correlation measure. These changes may be particularly tailored so as to establish relationships of the data signal within a particular tile, region in a tile or bit cell pattern of the modulated host. To do so, the embedder adjusts bit cells that violate the relationship so that the relationship needed to encode a bit (or M-ary symbol) value is satisfied and the thresholds for perceptibility are satisfied. Where robustness constraints are dominant, the embedder will exceed the perceptibility threshold where necessary to satisfy a desired robustness threshold.

The robustness model may also model distortion expected to be incurred by the modulated host, apply the distortion to the modulated host, and repeat the above process of measuring detection metrics and adjusting the amount of alterations so that the data signal will withstand the distortion. See, e.g., Ser. Nos. 14/616,686, 14/588,636 and 13/975,919 for image related processing.

This modulated host is then output as an output image signal 232, with a data channel encoded in it. The operation of combining also may occur in the analog realm where the data signal is transformed to a rendered form, such as a layer of ink or coating applied by a commercial press to substrate. Another example is a data signal that is overprinted as a layer of material, engraved in, or etched onto a substrate, where it may be mixed with other signals applied to the substrate by similar or other marking methods. In these cases, the embedder employs a predictive model of distortion and host signal interference and adjusts the data signal strength so that it will be recovered more reliably. The predictive modeling can be executed by a classifier that classifies types of noise sources or classes of host image and adapts signal strength and configuration of the data pattern to be more reliable to the classes of noise sources and host image signals that the encoded data signal is likely to be encounter or be combined with.

The output 232 from the Embedder signal typically incurs various forms of distortion through its distribution or use. For printed objects, this distortion occurs through rendering an image with the encoded signal in the printing process, and subsequent scanning back to a digital image via a camera or like image sensor.

Turning to FIG. 2, the signal decoder receives an encoded host signal 240 and operates on it with one or more processing stages to detect a data signal, synchronize it, and extract data.

The decoder is paired with an input device in which a sensor captures an analog form of the signal and an analog to digital converter converts it to a digital form for digital signal processing. Though aspects of the decoder may be implemented as analog components, e.g., such as preprocessing filters that seek to isolate or amplify the data channel relative to noise, much of the decoder is implemented as digital signal processing modules that implement the signal processing operations within a scanner. As noted, these modules can be implemented as software instructions executed within an image scanner or camera, an FPGA, or ASIC, etc.

The detector 242 is a signal processing module that detects presence of the data channel. The incoming signal is referred to as a suspect host because it may not have a data channel or may be so distorted as to render the data channel undetectable. The detector is in communication with a protocol selector 244 to get the protocols it uses to detect the data channel. It may be configured to detect multiple protocols, either by detecting a protocol in the suspect signal and/or inferring the protocol based on attributes of the host signal or other sensed context information. A portion of the data signal may have the purpose of indicating the protocol of another portion of the data signal. As such, the detector is shown as providing a protocol indicator signal back to the protocol selector 244.

The synchronizer module 246 synchronizes the incoming signal to enable data extraction. Synchronizing includes, for example, determining the distortion to the host signal and compensating for it. This process provides the location and arrangement of encoded data elements within the host signal.

The data extractor module 248 gets this location and arrangement and the corresponding protocol and demodulates a data signal from the host. The location and arrangement provide the locations of encoded data elements. The extractor obtains estimates of the encoded data elements and performs a series of signal decoding operations.

As detailed in examples below and in the incorporated documents, the detector, synchronizer and data extractor may share common operations, and in some cases may be combined. For example, the detector and synchronizer may be combined, as initial detection of a portion of the data signal used for synchronization indicates presence of a candidate data signal, and determination of the synchronization of that candidate data signal provides synchronization parameters that enable the data extractor to apply extraction filters at the correct orientation, scale and start location of a tile. Similarly, data extraction filters used within data extractor may also be used to detect portions of the data signal within the detector or synchronizer modules. The decoder architecture may be designed with a data flow in which common operations are re-used iteratively, or may be organized in separate stages in pipelined digital logic circuits so that the host data flows efficiently through the pipeline of digital signal operations with minimal need to move partially processed versions of the host data to and from a shared memory unit, such as a RAM memory.

Signal Generator

Figure 3:
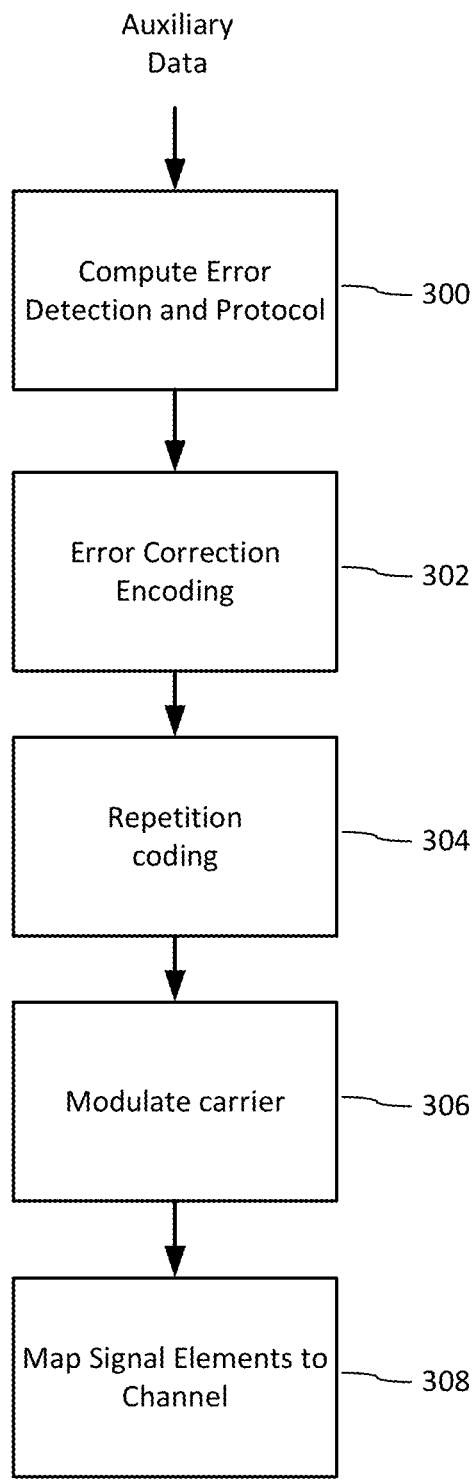
FIG. 3 is a flow diagram illustrating operations of a signal generator.

FIG. 3 is a flow diagram illustrating operations of a signal generator. Each of the blocks in the diagram depict processing modules that transform the input auxiliary data into a digital payload data signal structure. The input auxiliary data may include, e.g., a Global Trade Item Number (GTIN) developed by GS1. For example, the GTIN may be structured in the GTIN-12 format for UPC codes. Of course, the input auxiliary data may represent other plural bit codes as well. For a given protocol, each block provides one or more processing stage options selected according to the protocol. In processing module 300, the auxiliary data payload is processed to compute error detection bits, e.g., such as a Cyclic Redundancy Check (CRC), Parity, check sum or like error detection message symbols. Additional fixed and variable messages used in identifying the protocol and facilitating detection, such as synchronization signals may be added at this stage or subsequent stages.

Error correction encoding module 302 transforms the message symbols of the digital payload signal into an array of encoded message elements (e.g., binary or M-ary elements) using an error correction method. Examples include block codes, BCH, Reed Solomon, convolutional codes, turbo codes, etc.

Repetition encoding module 304 repeats and concatenates the string of symbols from the prior stage to improve robustness. For example, certain message symbols may be repeated at the same or different rates by mapping them to multiple locations within a unit area of the data channel (e.g., one unit area being a tile of bit cells, as described further below).

Repetition encoding may be removed and replaced entirely with error correction coding. For example, rather than applying convolutional encoding (1/3 rate) followed by repetition (repeat three times), these two can be replaced by convolution encoding to produce a coded payload with approximately the same length.

Next, carrier modulation module 306 takes message elements of the previous stage and modulates them onto corresponding carrier signals. For example, a carrier might be an array of pseudorandom signal elements, with equal number of positive and negative elements (e.g., 16, 32, 64 elements), or other waveform, such as sine wave or orthogonal array. In the case of positive and negative elements, the payload signal is a form of binary antipodal signal. It also may be formed into a ternary (of 3 levels, −1, 0, 1) or M-ary signal (of M levels). These carrier signals may be mapped to spatial domain locations or spatial frequency domain locations. Another example of carrier signals are sine waves, which are modulated using a modulation scheme like phase shifting, phase quantization, and/or on/off keying. In one embodiment, carrier modulation module XORs each bit of a scrambled signature with a string of 16 binary elements (a "spreading key"), yielding 16 "chips" having "0" and "1" values. If error correction encoding yields a signature of 1024 bits (which can then be randomized), then the carrier modulation module 306 produces 16,384 output chips.

Mapping module 308 maps signal elements of each modulated carrier signal to locations within the channel. In the case where a digital host signal is provided, the locations correspond to embedding locations within the host signal. The embedding locations may be in one or more coordinate system domains in which the host signal is represented within a memory of the signal encoder. The locations may correspond to regions in a spatial domain, temporal domain, frequency domain, or some other transform domain. Stated another way, the locations may correspond to a vector of host signal features, which are modulated to encode a data signal within the features.

Mapping module 308 also maps a synchronization signal to embedding locations within the host signal, for embodiments employing an explicit synchronization signal. An explicit synchronization signal is described further below.

To accurately recover the payload, the decoder extracts estimates of the coded bits at the embedding locations within each tile. This requires the decoder to synchronize the image under analysis to determine the embedding locations. For images, where the embedding locations are arranged in two dimensional blocks within a tile, the synchronizer determines rotation, scale and translation (origin) of each tile. This may also involve approximating the geometric distortion of the tile by an affine transformation that maps the embedded signal back to its original embedding locations.

To facilitate synchronization, the auxiliary signal may include an explicit or implicit synchronization signal. An explicit synchronization signal is an auxiliary signal separate from the encoded payload that is embedded with the encoded payload, e.g., within the same tile). An implicit synchronization signal is a signal formed with the encoded payload, giving it structure that facilitates geometric/temporal synchronization. Examples of explicit and implicit synchronization signals are provided in our previously cited patents U.S. Pat. Nos. 6,614,914, and 5,862,260, which are each hereby incorporated herein by reference in their entirety.

In particular, one example of an explicit synchronization signal is a signal comprised of a set of sine waves, with pseudo-random phase, which appear as peaks in the Fourier domain of the suspect signal. See, e.g., U.S. Pat. Nos. 6,614,914, and 5,862,260, describing use of a synchronization signal in conjunction with a robust data signal. Also see U.S. Pat. No. 7,986,807, which is hereby incorporated by reference in its entirety.

Our US Patent Application Publication No. US 2012-0078989 A1, which is hereby incorporated by reference in its entirety, provides additional methods for detecting an embedded signal with this type of structure and recovering rotation, scale and translation from these methods.

Examples of implicit synchronization signals, and their use, are provided in U.S. Pat. Nos. 6,614,914 and 5,862,260, as well as U.S. Pat. Nos. 6,625,297 and 7,072,490, and U.S. patent application Ser. No. 14/724,729 (issued as U.S. Pat. No. 9,747,656), which are hereby incorporated by reference in their entirety.

Signal Embedding In Host

FIG. 4 is a diagram illustrating embedding of an auxiliary signal into host signal. As shown, the inputs are a host signal block (e.g., blocks of a host digital image) (320) and an encoded auxiliary signal (322), which is to be inserted into the signal block. The encoded auxiliary signal may include an explicit synchronization component, or the encoded payload may be formulated to provide an implicit synchronization signal. Processing block 324 is a routine of software instructions or equivalent digital logic configured to insert the mapped signal(s) into the host by adjusting the corresponding host signal sample(s) at an embedding location according to the value of the mapped signal element. For example, the mapped signal is added/subtracted from corresponding a sample value, with scale factor and threshold from the perceptual model or like mask controlling the adjustment amplitude. In implementations with an explicit synchronization signal, the encoded payload and synchronization signals may be combined and then added or added separately with separate mask coefficients to control the signal amplitude independently.

Following the construction of the payload, error correction coding is applied to the binary sequence. This implementation applies a convolutional coder at rate 1/4, which produces an encoded payload signal of 4096 bits. Each of these bits is modulated onto a binary antipodal, pseudorandom carrier sequence (−1, 1) of length 16, e.g., multiply or XOR the payload bit with the binary equivalent of chip elements in its carrier to yield 4096 modulated carriers, for a signal comprising 65,536 elements. These elements map to the 65,536 embedding locations in each of the 256 by 256 tiles.

An alternative embodiment, for robust encoding on packaging employs tiles of 128 by 128 embedding locations. Through convolutional coding of an input payload at rate 1/3 and subsequent repetition coding, an encoded payload of 1024 bits is generated. Each of these bits is modulated onto a similar carrier sequence of length 16, and the resulting 16,384 signal elements are mapped to the 16,384 embedding locations within the 128 by 128 tile.

There are several alternatives for mapping functions to map the encoded payload to embedding locations. In one, these elements have a pseudorandom mapping to the embedding locations. In another, they are mapped to bit cell patterns of differentially encoded bit cells as described in U.S. patent application Ser. No. 14/724,729 (issued as U.S. Pat. No. 7,747,656). In the latter, the tile size may be increased to accommodate the differential encoding of each encoded bit in a pattern of differential encoded bit cells, where the bit cells corresponding to embedding locations at a target resolution (e.g., 300 DPI).

Our U.S. patent application Ser. No. 14/725,399 (issued as U.S. Pat. No. 9,635,378), describes methods for inserting auxiliary signals in areas of package and label designs that have little host image variability. These methods are particularly useful for labels, including price change labels and fresh food labels. These signal encoding methods may be ported to the printing sub-system in scales used within fresh food, deli and meat departments to encode GTINs and control flags for variable weight items in the image of a label, which is then printed by the printer sub-system (typically a thermal printer) on the label and affixed to an item.

For an explicit synchronization signal, the mapping function maps a discrete digital image of the synchronization signal to the host image block. For example, where the synchronization signal comprises a set of Fourier magnitude peaks or sinusoids with pseudorandom phase, the synchronization signal is generated in the spatial domain in a block size coextensive with the 256 by 256 tile (or other the size, e.g., 128 by 128) at target embedding resolution.

Various detailed examples of encoding protocols and processing stages of these protocols are provided in our prior work, such as our U.S. Pat. Nos. 6,614,914, 5,862,260, and 6,674,876, which are hereby incorporated by reference, and US Patent Publication No. US 2010-0150434 A1 and U.S. patent application Ser. No. 14/725,399, issued as U.S. Pat. No. 9,635,378, previously incorporated. More background on signaling protocols, and schemes for managing compatibility among protocols, are provided in U.S. Pat. No. 7,412,072, which is hereby incorporated by reference.

Figure 9:
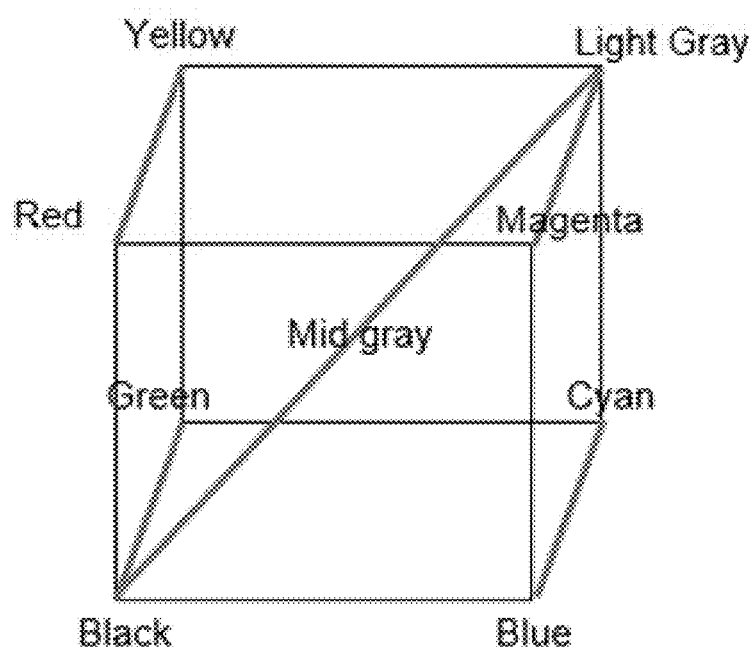
FIG. 9 is a diagram showing a color space.

One signaling approach, which is detailed in U.S. Pat. Nos. 6,614,914, and 5,862,260, is to map elements to pseudo-random locations within a channel defined by a domain of a host signal. See, e.g., FIG. 9 of now U.S. Pat. No. 6,614,914. In particular, elements of a watermark signal are assigned to pseudo-random embedding locations within an arrangement of sub-blocks within a block (referred to as a "tile"). The elements of this watermark signal correspond to error correction coded bits. These bits are modulated onto a pseudo-random carrier to produce watermark signal elements (block 306 of FIG. 3), which in turn, are assigned to the pseudorandom embedding locations within the sub-blocks (block 308 of FIG. 3). An embedder module modulates this signal onto a host signal by increasing or decreasing host signal values at these locations for each error correction coded bit according to the values of the corresponding elements of the modulated carrier signal for that bit.

FIG. 5 is a flow diagram illustrating a method for decoding a payload signal from a host image signal. Implementations of a watermark decoder and watermark processors available from Digimarc Corporation include:

Digimarc Mobile Software Development Kit; and
Digimarc Embedded Systems SDK.

The Embedded Systems SDK is the one typically integrated into scanner hardware.

Corresponding encoder embodiments available from Digimarc Corporation include:
Digimarc Barcode SDKs
Digimarc Barcode Plugin Returning to FIG. 5, the frames are captured at a resolution preferably near the resolution at which the auxiliary signal has been encoded within the original image (e.g., 300 DPI, 100 DPI, etc.). An image up-sampling or down-sampling operation may be performed to convert the image frames supplied by the imager to a target resolution for further decoding.

The resulting image blocks supplied to the decoder from these frames may potentially include an image with the payload. At least some number of tiles of encoded signal may be captured within the field of view, if an object with encoded data is being scanned. Otherwise, no encoded tiles will be present. The objective, therefore, is to determine as efficiently as possible whether encoded tiles are present.

In the initial processing of the decoding method, it is advantageous to select frames and blocks within frames that have image content that are most likely to contain the encoded payload. From the image passed to the decoder, the decoder selects image blocks for further analysis. The block size of these blocks is set large enough to span substantially all of a complete tile of encoded payload signal, and preferably a cluster of neighboring tiles. However, because the distance from the camera may vary, the spatial scale of the encoded signal is likely to vary from its scale at the time of encoding. This spatial scale distortion is further addressed in the synchronization process.

For more on block selection, please see US Published Patent Application No. US 2015-0030201 A1, which are each hereby incorporated by reference in its entirety.

Please also see U.S. Pat. No. 9,922,220, which is hereby incorporated by reference, for more on block selection where processing time is more limited.

The first stage of the decoding process filters the image to prepare it for detection and synchronization of the encoded signal (402). The decoding process sub-divides the image into blocks and selects blocks for further decoding operations. For color images, a first filtering stage converts the input color image signal (e.g., RGB values) to a color channel or channels where the auxiliary signal has been encoded. See, e.g., U.S. Pat. No. 9,117,268, which is hereby incorporated herein by reference in its entirety, for more on color channel encoding and decoding. For an image captured under red illumination by a monochrome scanner, the decoding process operates on this "red" channel sensed by the scanner. Some scanners may pulse LEDs of different color to obtain plural color or spectral samples per pixel as described in our Patent Application Publication No. US 2013-0329006 A1, which is hereby incorporated by reference.

A second filtering operation isolates the auxiliary signal from the host image. Pre-filtering is adapted for the auxiliary signal encoding format, including the type of synchronization employed. For example, where an explicit synchronization signal is used, pre-filtering is adapted to isolate the explicit synchronization signal for the synchronization process.

In some embodiments, the synchronization signal is a collection of peaks in the Fourier domain. Prior to conversion to the Fourier domain, the image blocks are pre-filtered. See, e.g., LaPlacian pre-filter in U.S. Pat. No. 6,614,914. A window function is applied to the blocks and then a transform to the Fourier domain, applying an FFT. Another filtering operation is performed in the Fourier domain. See, e.g., pre-filtering options in U.S. Pat. Nos. 6,988,202, 6,614,914, and 9,182,778, which are hereby incorporated by reference in their entirety.

For more on filters, also see U.S. Pat. No. 7,076,082, which is hereby incorporated by reference in its entirety. This patent describes a multi-axis filter, e.g., an oct-axis filter. Oct axis compares a discrete image sample with eight neighbors to provide a compare value (e.g., +1 for positive difference, −1 or negative difference), and sums the compare values. Different arrangements of neighbors and weights may be, applied to shape the filter according to different functions. Another filter variant is a cross shaped filter, in which a sample of interest is compared with an average of horizontal neighbors and vertical neighbors, which are then similarly summed.

Next, synchronization process (404) is executed on a filtered block to recover the rotation, spatial scale, and translation of the encoded signal tiles. This process may, employ a log polar method as detailed in U.S. Pat. No. 6,614,914 or least squares approach of U.S. Pat. No. 9,182,778, to recover rotation and scale of a synchronization signal comprised of peaks in the Fourier domain. To recover translation, the phase correlation method of U.S. Pat. No. 6,614,914 is used, or phase estimation and phase deviation methods of U.S. Pat. No. 9,182,778 are used.

Alternative methods perform synchronization on an implicit synchronization signal, e.g., as detailed in Ser. No. 14/724,729 (issued as U.S. Pat. No. 9,747,656).

Next, the decoder steps through the embedding locations in a tile, extracting bit estimates from each location (406). This process applies, for each location, the rotation, scale and translation parameters, to extract a bit estimate from each embedding location (406). In particle, as it visits each embedding location in a tile, it transforms it to a location in the received image based on the affine transform parameters derived in the synchronization, and then samples around each location. It does this process for the embedding location and its neighbors to feed inputs to an extraction filter (e.g., oct-axis or cross shaped). A bit estimate is extracted at each embedding location using filtering operations, e.g., oct axis or cross shaped filter (see above), to compare a sample at embedding locations with neighbors. The output (e.g., 1, −1) of each compare operation is summed to provide an estimate for an embedding location. Each bit estimate at an embedding location corresponds to an element of a modulated carrier signal.

The signal decoder estimates a value of each error correction encoded bit by accumulating the bit estimates from the embedding locations of the carrier signal for that bit (408). For instance, in the encoder embodiment above, error correction encoded bits are modulated over a corresponding carrier signal with 16 elements (e.g., multiplied by or XOR with a binary anti-podal signal). A bit value is demodulated from the estimates extracted from the corresponding embedding locations of these elements. This demodulation operation multiplies the estimate by the carrier signal sign and adds the result. This demodulation provides a soft estimate for each error correction encoded bit.

These soft estimates are input to an error correction decoder to produce the payload signal (410). For a convolutional encoded payload, a Viterbi decoder is used to produce the payload signal, including the checksum or CRC. For other forms of error correction, a compatible decoder is applied to reconstruct the payload. Examples include block codes, BCH, Reed Solomon, Turbo codes.

Next, the payload is validated by computing the check sum and comparing with the decoded checksum bits (412).

The check sum matches the one in the encoder, of course. For the example above, the decoder computes a CRC for a portion of the payload and compares it with the CRC portion in the payload.

At this stage, the payload is stored in shared memory of the decoder process. The recognition unit in which the decoder process resides returns it to the controller via its interface. This may be accomplished by various communication schemes, such as IPC, shared memory within a process, DMA, etc.

II. Determining a Candidate Color Direction for Embedding

We noticed an academic paper by Q. Xu, Q. Zhai, M. R. Luo, H. Gu, and D. Sekulovski, "A Study of Visible Chromatic Contrast Threshold Based on Different Color Directions and Spatial Frequencies," Proc. 26th IS&T Color Imaging Conference, pp. 53-58, 2018, which is hereby incorporated herein by reference in its entirety. That paper summarized an experiment to produce chromatic contrast sensitivity (CCS) data at low frequencies. The experiment used forced-choice stair-case method to investigate the CCS just noticeable difference (JND) in different color changing directions at different spatial frequencies. The JND ellipses at different low, spatial frequencies were fitted. The intended application of the Xu et al. paper appears to be the Light Emitting Diode (LED) and imaging industry.

To investigate our color/frequency needs, we initiated a study to discern CCS data at higher frequencies and involving many different color directions. Obtained information helped develop models to predict visibility of a watermark signal, allowing maximum signal to be added to an image within a visibility constraint. Developing these visibility models required accurate measurements of the Chromatic Contrast Sensitivity (CCS) of human observers. One experiment evaluated a spatial frequency range of 2.4 to 19.1 cycles per degree (cpd), with multiple different color directions in the CIELAB color space. Results of this study are provided in Appendix A, which is hereby incorporated herein by reference. Appendix A provides measurements of spatial chromatic contrast sensitivity in several chromatic directions of the CIELAB color space. The chromatic stimuli used in Appendix A is a vertical Gabor stimuli, i.e., sinusoidal gratings multiplied by a 2D Gaussian window. In contrast with Xu et al. Appendix A provides data covering higher spatial frequencies. Additionally, we also investigated the impact of spatial orientation on the chromatic contrast sensitivity. This testing was helpful and showed that 1 JND visibility ellipses in a-b space change in shape for different regions of color space, including at higher frequencies.

But we needed analysis beyond a sinusoidal vertical Gabor. For example, one of Digimarc's watermark signals exists at much higher frequency levels than were considered in the Xu et al. paper and can be conveyed with many different color centers than he tested. For example, see, e.g., FIG. 6, the green dashed line, where a 150 wpi watermark signal is shown relative to contrast sensitivity. WPI in this context is related to the number of watermark signal elements per inch. A 150 wpi signal has more signal elements per inch relative to a 75 wpi signal. FIG. 6 shows chromatic contrast sensitively for a 150 wpi watermark signal. As a reminder, direction 'a' corresponds to red/green and direction 'b' corresponds to blue/yellow. A past assumption in signal encoding was that the lowest visibility direction for signal insertion was in the 'b' direction. Chromatic contrast sensitive information can also be displayed as shown by an ellipse in FIG. 7. The green line shows CCSF for 12 cycles/degree, which corresponds to a mid-grid frequency of a 150 wpi watermark. A larger 'b' distance implies lower visibility of a color change, e.g., due to signal insertion. FIG. 7 illustrates an assumption that a ratio of $\Delta b/\Delta a$ to produce 1 Just Noticeable Difference (JND)~2.

We have found that there are different color directions (besides along the b axis) that provide better visibility with the same signal robustness. We conducted chromatic contrast sensitive testing of our 150 wpi signal to determine such directions depending on color space. Some of our findings are summarized in FIG. 8A, which shows that a direction of minimum sensitivity of a watermark signal at 150 wpi ("MinSens150wpi.") is NOT along the 'b' direction. In fact, the absolute minimum visibility is at an angle α, between a and MinSens150wpi. The resulting 1 JND ellipse (green line in FIG. 8A) has a significantly larger $\Delta a$ at 1 JND than going along the red arrow 'a' direction. This suggests that at the same visibility, watermark signal robustness should be higher in an ellipse with angle α compared to an ellipse shown in FIG. 7. This is different than assumptions in the art which have suggested that CCSF is constant for different base colors. Indeed, our findings show that this is NOT the case. Applied to watermarking, watermark of same magnitude on different base colors, has a DIFFERENT visibility.

To further illustrate our assumptions, a gray patch was encoded with a 150 wpi watermark signal using different Aa and Ab values from a 1 JND visibility ellipse. Seven (7) total encoded gray patches were evaluated. FIG. 8C shows the ellipse boundary with the thin green line. Five of the seven patches are illustrated in FIG. 8C along the ellipse as shown by blue circles. An encoded signal robustness score (e.g., a local score) was calculated for each encoded gray patch. Local score is plotted against encoding (or embedding) angle in FIG. 8B. Assuming that the encoding comprises both a synchronization component and an orientation component, the local score can be measure associated with detectability of a combination of these components. For example, a combination of LGS and MS, as described in Assignee's US Patent Nos 10,217,182, which is hereby incorporated herein by reference in its entirety, could be used as the local score. Or, a swipe score or local score described in assignee's U.S. Pat. No. 10,382,645, which is hereby incorporated herein by reference in its entirety, could be used as a robustness or local score. A high local score corresponds to black in FIG. 8C, while a low local score corresponds to a light gray. The sliding local score scale is shown in the top right of FIG. 8C, between 0 and 80. A signal detector operated on the seven (7) encoded patches to determine a local score, which are plotted in FIG. 8B according to their various embed angles. Local scores are plotted for embed angle of 0 and 55 degrees, with a peak local score shown at an embed angle of about 38 degrees. Five (5) of these patches are shown in FIG. 8C with different grayscales for the signal robustness filling the blue circle.

Figure 10:
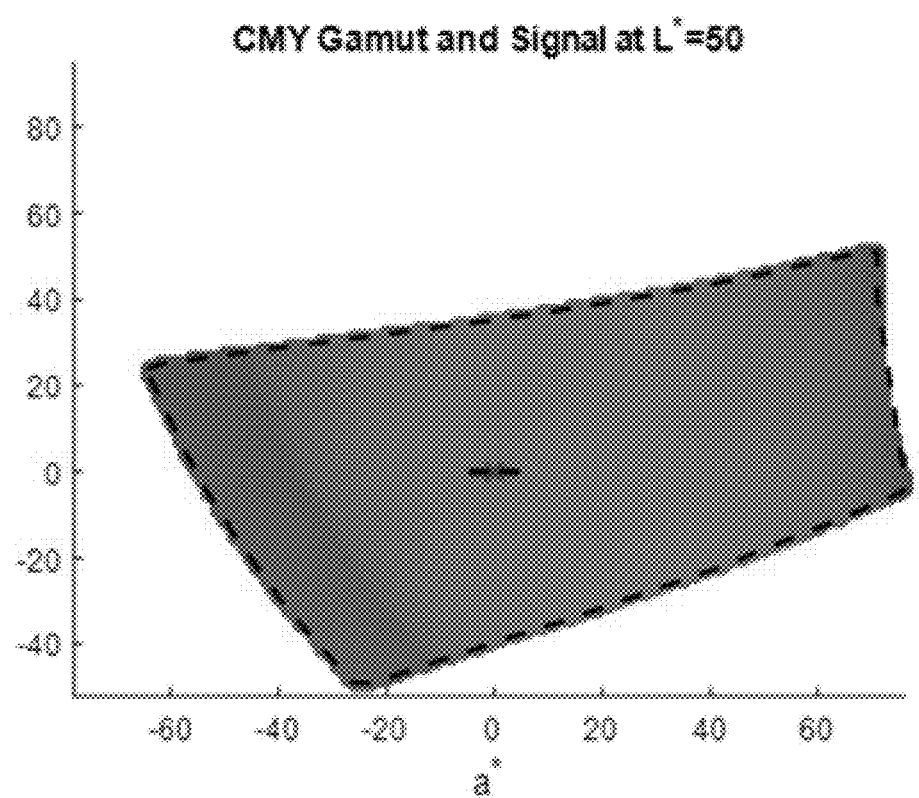
FIG. 10 is a diagram showing a CMY gamut and signal at $L^*=50$.
Figure 11A:
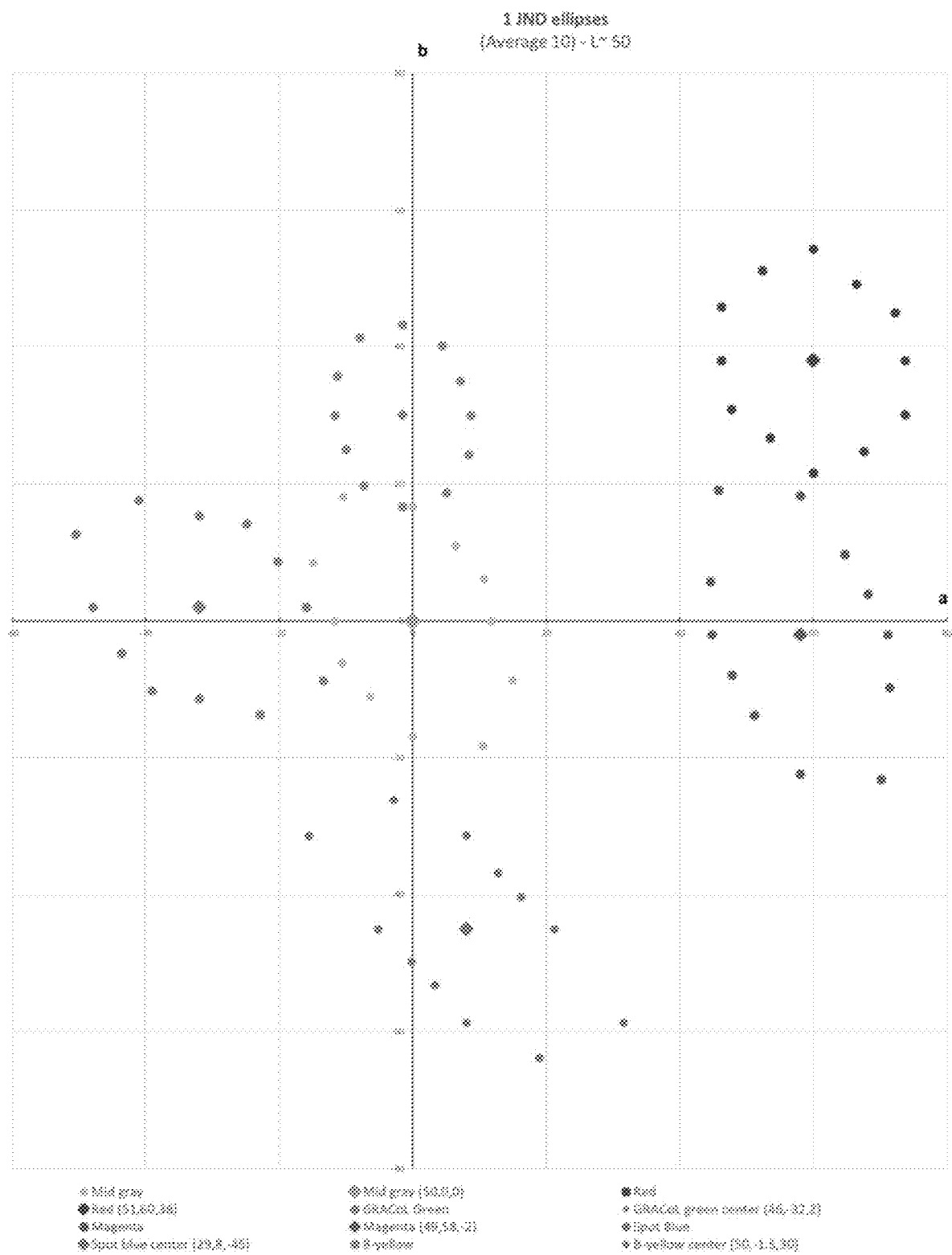
FIGS. 11A & 11B are plots showing 1 JND ellipses for different colors.
Figure 13:
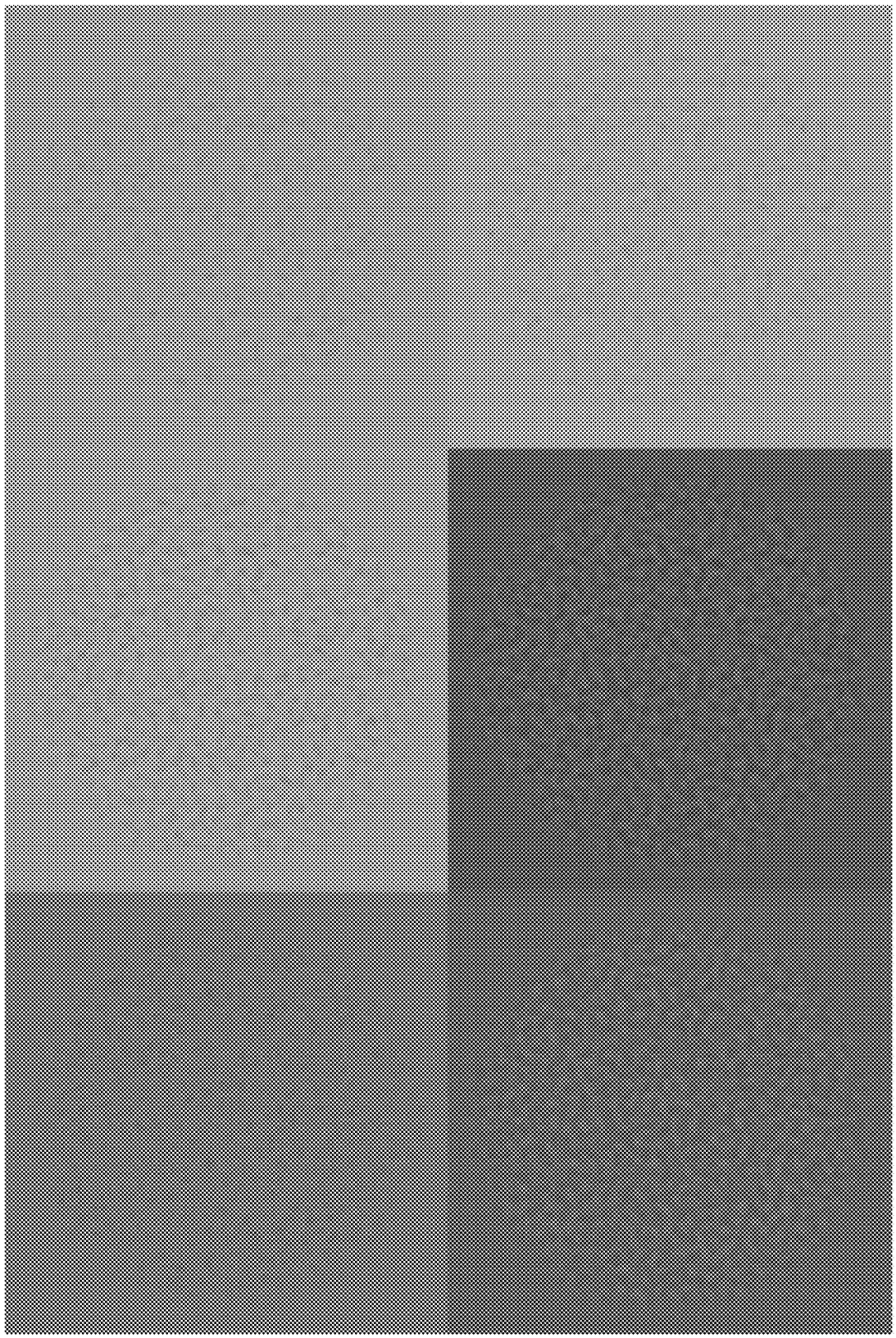
FIG. 13 shows 150 wpi watermark modulated on six color centers in different CIELAB chromatic directions: Top row: 0°, 30°, and 60°; Bottom row: 90°, 120°, and 150°.

As discussed above, we needed more than just a sine wave in color space testing, so we measured the 1 JND visibility ellipse of a 150 wpi watermark tile. Since ellipse varies with color center, we decided to sample the GRACoL CMYK color gamut approximately evenly in the CEILAB color space. So, we coarsely sampled this volume by measuring the colors shown in FIG. 9. The color centers were chosen to be within the GRACoL gamut for a signal with an approximate L*=50 (see FIG. 10). Results are shown in the table below, and some are plotted in FIG. 11A The testing involved a psychophysical experiment for collecting thresholds of just noticeable chromatic 150 wpi watermark. The experiment was performed on a 10-bit EIZO ColorEdge CG248-4K 24″ display at its native 4K resolution. The white point of the display was set to a D50 chromaticity at 160 cd/m2 luminance. The gamma of the display was set to 2.2. The display was calibrated, through the Psych toolbox (Brainard 1997), using a third-order polynomial transform between the device RGB values and the displayed XYZ tristimulus. The chromatic stimuli were obtained by modulating a 150 wpi watermark along six different directions of the CIELAB color space—0°, 30°, 60°, 120°, and 150° with respect to the right a*-axis. Prior to modulation, the watermark was multiplied by a circular 2D Tukey window, whose flat area (its diameter) corresponded to a visual angle of 2° subtended at the observer's retina. The windowed watermark was spatially added to one of the six directions in the a*-b* chromatic plane of the base color (color center). We used a total of 26 different CIELAB color centers. Along the six chromatic directions, the strength of the modulated watermark was varied in terms of Δab—the Euclidean distance between the color center and the furthest watermark pixel in the a*-b* plane. Examples of the watermark stimuli, modulated at six different color centers and chromatic directions, are shown in FIG. 13. FIG. 13 show the watermark modulated on six color centers in different CIELAB chromatic directions: Top row: 0°, 30°, and 60°; Bottom row: 90°. 120°, and 150°. Ten observers, of which five males and five females, with normal or corrected-to-normal color vision, participated in the experiment. The stimuli were observed in a dark room at 60 cm viewing distance. The whole experiment was split into six sessions. Maximum of five color centers were measured in a single session. The observers were adapted to each color center before the JND measurement. The JND itself was obtained after 30 trials of a QUEST adaptive staircase method using a four-alternative-forced-choice input: the observer was supposed to click on only one of the four areas that contained a watermark modulated in a randomly chosen chromatic direction. The QUEST method is disclosed in A. Watson and D. Pelli, "QUEST: A Bayesian adaptive psychometric method". Attention, Perception & Psychophysics, Vol 33, No, 2, pp. 113-120, 1983, which is hereby incorporated herein by reference. Each observer responded to a total of 4680 displayed stimuli (30 trials×6 chromatic directions× 26 color centers). The average time for a single response was around 4 seconds; the total experiment time for all observers was around 53 hours.

| Color Centers | Color Name |
|---|---|
| 50,0,0 | Mid gray |
| 46,−32,2 | GRACoL Green |
| 56.5,−18.5,10 | LG-spot green |
| 44,−18.5,10 | MG-spot green |
| 29,−18.5,10 | B-spot green |
| 38,−37,20 | Spot Green |
| 33,4,−23 | GRACoL Blue |
| 52,4,−22.5 | LG-spot blue |
| 39.5,4,−22.5 | MG-spot blue |
| 24.5,4,−22.5 | B-spot blue |
| 29,8,−45 | Spot Blue |
| 75,0,0 | Light Gray |
| 62,29,−1 | LG-magenta |
| 49,58,−2 | Magenta |
| 61,−12.5,−9.5 | LG-cyan |
| 47,−25,−19 | Cyan |
| 77.5,−1.5,30 | LG-yellow |
| 65,−1.5,30 | MG-yellow |
| 50,−1.5,30 | B-yellow |
| 80,−3,60 | Yellow |
| 63,30,19 | LG-red |

-continued

| Color Centers | Color Name |
|---|---|
| 35.5,30,19 | B-red |
| 51,60,38 | Red |
| 20,0,0 | Black |
| 80,−3,60 | Yellow (gray adapt 80,0,0) |
| 80,−3,60 | Yellow (gray adapt 50,0,0) |

Figure 11B:
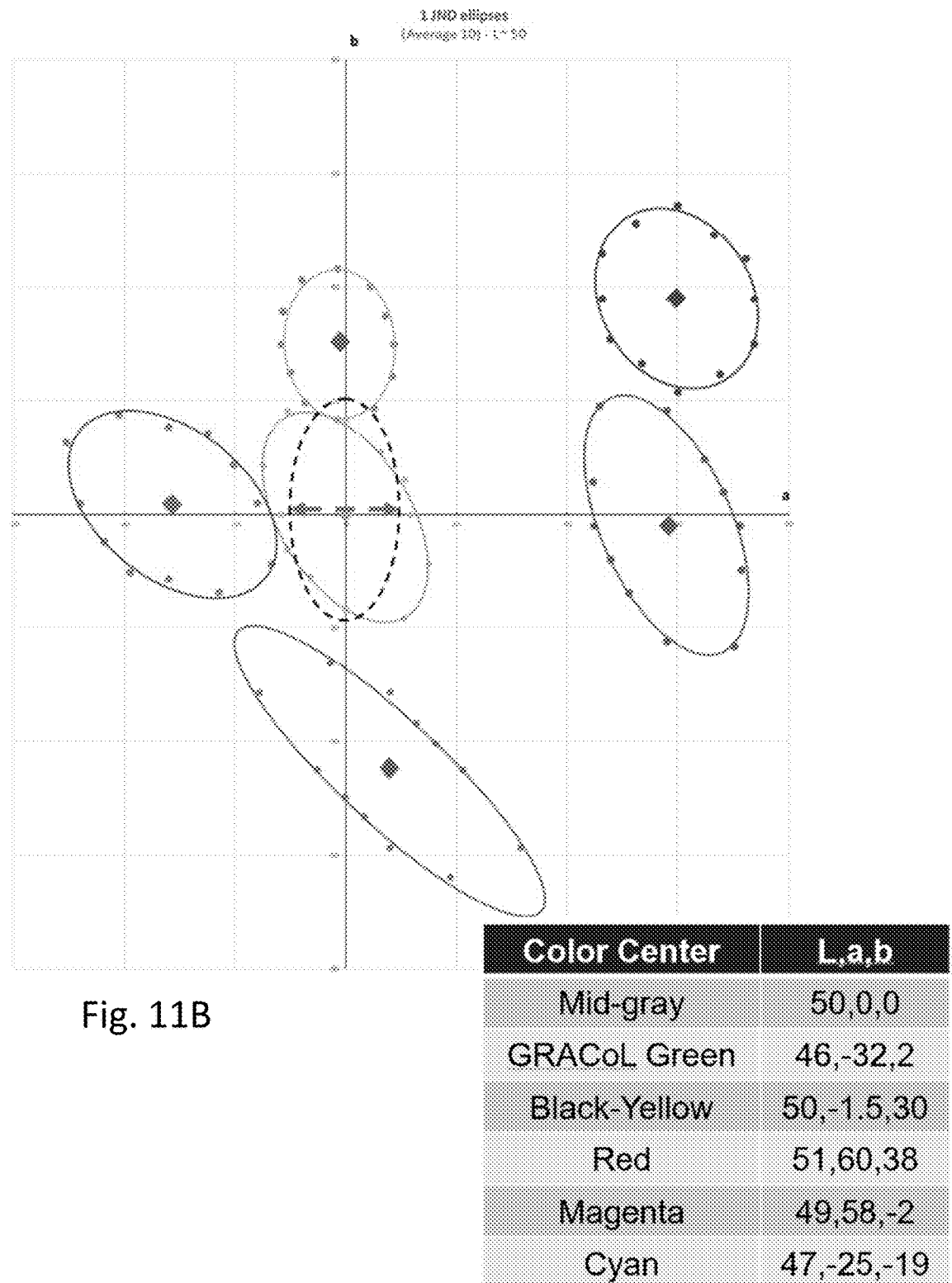

FIG. 11B is a plot of 1 JND Visibility Ellipses at L*~50. These plots include Mid-gray, GRACoL Green, Black-Yellow, Red, Magenta and Cyan. A dotted black ellipse is shown to representing encoding along the 'a' axis direction. The other color ellipses, however, show that a model only considering 'a' direction of α=0, would not provide the most signal hiding benefits, e.g., as shown with the Cyan ellipse and the Green ellipse. These two ellipses have steep a angles compared to the dotted black ellipse.

Figure 12:
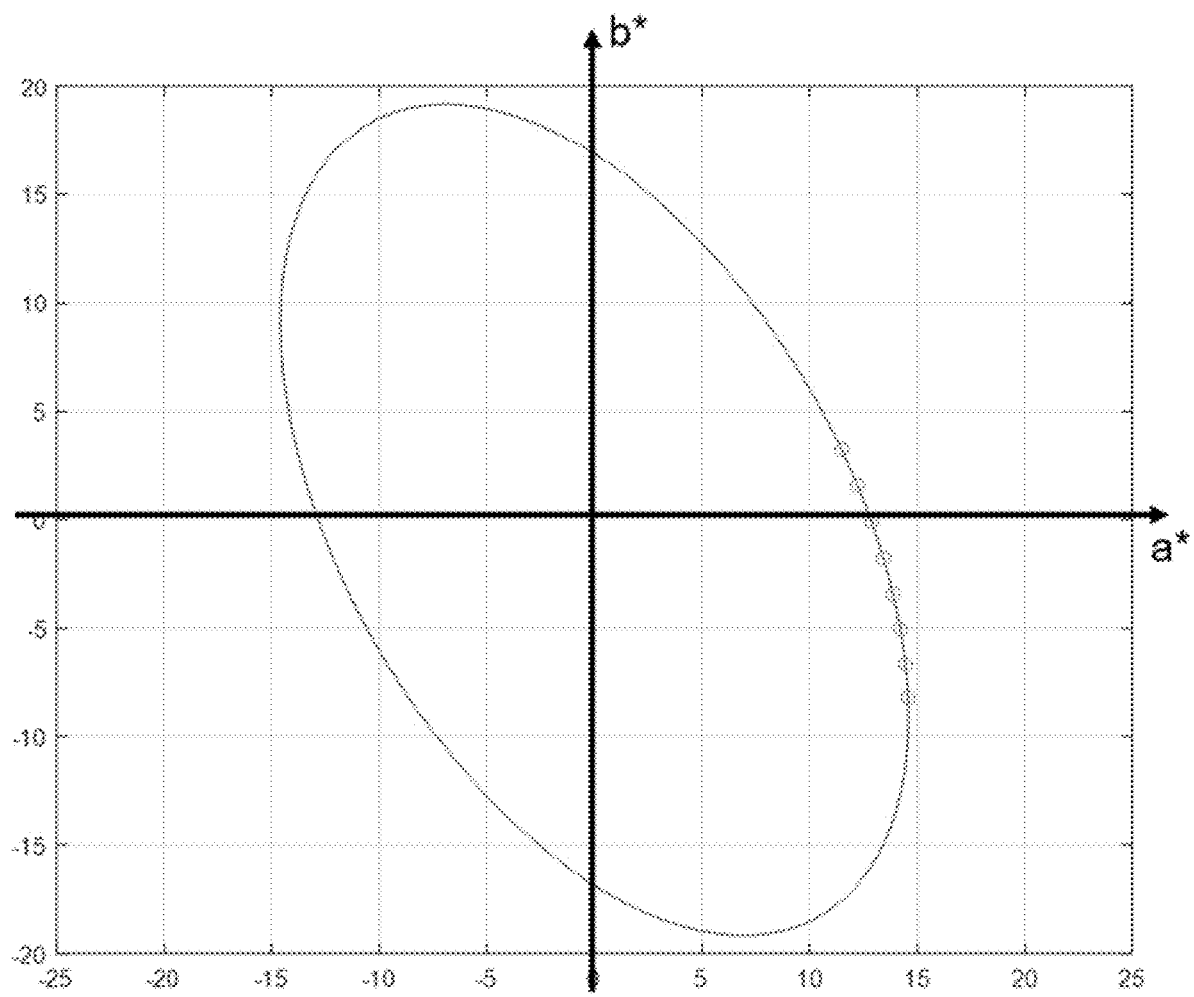
FIG. 12 is a 1 JND ellipse.

Per the testing above, the 1 JND response of 26 different color centers were measured to be an ellipse which varies in shape depending on base color. The 1 JND ellipse changes shape with different surround colors. To minimize this dependency on surround colors, 5 color samples close to gray were analyzed, to find an optimum embed direction. The 5 colors include: Mid-gray, LightGray-SpotGreen, LightGray-SpotBlue, LightGray-Cyan, and MidGray-Yellow. 1 JND ellipse of colors near gray stay relatively constant when surrounded by an average image content. Curve fitting software, e.g., including Matlab's curve fitting toolbox, can be used to determine an angle, α, and length of the major/minor axes of a color center ellipse. For each of the color centers, candidate locations along the ellipse were selected at different angles from +5 to −30 degrees around the positive 'Delta_a*' axis (see, e.g., green circles in FIG. 12). These candidate values were then used to direct encoding of separate 2″ by 2″ mid-gray patches with a 150 wpi watermark. A robustness measure or local score was measured for each embed angle. Across the five selected colors, an optimum embed angle in terms of signal robustness varied between −9 and −25 degrees, as shown in the table below. Averaging over these color centers results in a signal embed direction of −14 degrees, which can be used a compromise embed direction across the 5 colors. A −14 degree embed angle results in significantly more watermark signal being introduced into yellow compared to 'a'=0 degrees.

| color center | angle | deltaLocalScore |
|---|---|---|
| mid-gray | −9 | 17 |
| spot blue-light gray | −10 | 17 |
| green-light gray | −5 | 15 |
| cyan-light gray | −25 | 32 |
| yellow-mid gray | −17 | 8 |
| Average | −14 | 18 |

The visual significance of this change was determined as follows:
- Robustness at embed angle of −14 is selected as the target
- Embed strength increased in 'a' direction until target robustness matched
- The 2 equal robustness patches were then compared visually, with the Embedding at angle of −14 having lower visibility Watermark visibility of some colors can be significantly reduced while preserving robustness, by changing the enhancement color direction by some determined negative angle from the positive 'a' axis. In one example, at the same robustness, enhancement in direction of 'a' −14 degrees has a visibility that is better than or equal to enhancement along the 'a*' direction axis.

These example also show that 1 JND sensitively varies with base color. Ellipse size indicates magnitude of Δa and Δb required for 1 JND for various base colors. A smaller ellipse means that the human visual system (HDS) can see smaller change, e.g., due to watermark insertion. Also a direction of minimum sensitivity can also vary with base color. The Minimum sensitive direction does not stay constant. Thus, a compromise, e.g., averaging a direction over many color sample yields a compromise embedding direction.

III. Operating Environments

The components and operations of the various described embodiments and implementations shown in figures and/or discussed in text above, can be implemented in modules. Notwithstanding any specific discussion of the embodiments set forth herein, the term "module" may refer to software, firmware and/or circuitry configured to perform any of the methods, processes, algorithms, functions or operations described herein. Software may be embodied as a software package, code, instructions, instruction sets or data recorded on non-transitory computer readable storage mediums. Software instructions for implementing the detailed functionality can be authored by artisans without undue experimentation from the descriptions provided herein, e.g., written in C, C++, Objective-C, and C #, Ruby, MatLab, Visual Basic, Java, Python, Tcl, Perl, Scheme, and assembled in executable binary files, etc., in conjunction with associated data. Firmware may be embodied as code, instructions or instruction sets or data that are hard-coded (e.g., nonvolatile) in memory devices. As used herein, the term "circuitry" may include, for example, singly or in any combination, hard-wired circuitry, programmable circuitry such as one or more computer processors comprising one or more individual instruction processing cores, parallel processors, state machine circuitry, or firmware that stores instructions executed by programmable circuitry.

Applicant's work also includes taking the scientific principles and natural laws on which the present technology rests, and tying them down in particularly defined implementations. For example, the systems and methods described with reference to FIGS. 7-13. One such realization of such implementations is electronic circuitry that has been custom-designed and manufactured to perform some or all of the component acts, as an application specific integrated circuit (ASIC).

To realize such implementations, some or all of the technology is first implemented using a general purpose computer, using software such as MatLab (from Math-Works, Inc.). A tool such as HDLCoder (also available from MathWorks) is next employed to convert the MatLab model to VHDL (an IEEE standard, and doubtless the most common hardware design language). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

Another specific implementation of the present disclosure includes selecting an optimum embed direction via a specifically configured smartphone iPhone 11 or Android device) or other mobile device, such phone or device. The smartphone or mobile device may be configured and controlled by software (e.g., an App or operating system) resident on the smartphone device.

The methods, processes, components, technology, apparatus and systems described above may be implemented in hardware, software or a combination of hardware and software. For example, the color managed embedding and optimizations may be implemented in software, firmware, hardware, combinations of software, firmware and hardware, a programmable computer, electronic processing circuitry, digital signal processors (DSP), FPGAs graphic processing units (GPUs), a programmable computer, electronic processing circuitry, and/or by executing software or instructions with a one or more processors including parallel processors, multi-core processor(s) and/or other multi-processor configurations.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicant hereby incorporates by reference each of the above referenced patent documents in its entirety.

The particular combinations of elements and features in the above-detailed embodiments are exemplary only; the interchanging and substitution of these teachings with other teachings in this and the incorporated-by-reference patents and documents are also contemplated,

What is claimed is:

1. An image processing method comprising:
   collecting chromatic contrast sensitivity data gathered from observation of an encoded signal, the data representing multiple color encoding angles;
   from the data, generating a 1 Just Noticeable Difference (JND) ellipse around a first color center,
   from the ellipse, determining a signal encode direction, the signal encode direction comprising an angle α representing a negative angle between the 'a*' axis in an CIELAB space and a direction of minimum sensitivity of an encoded signal;
   transforming color artwork to include an encoded signal, said transforming utilizing the angle α.

2. A non-transitory computer readable medium comprising instructions stored therein that, when executed by one or more processors, cause the one or more processors to perform:
   accessing chromatic contrast sensitivity data gathered from observation of an encoded signal, the data representing multiple color encoding angles;
   from the data, generating a 1 Just Noticeable Difference (JND) ellipse around a first color center,
   from the ellipse, determining a signal encode direction, the signal encode direction comprising an angle α representing a negative angle between the 'a*' axis in an CIELAB space and a direction of minimum sensitivity of an encoded signal;

transforming color artwork to include an encoded signal, said transforming utilizing the angle α.

3. The method of claim 1 in which the angle α comprises −9 degrees ≥α≥−25 degrees.

4. The method of claim 1 in which the angle α comprises −14 degrees.

5. The non-transitory computer readable medium of claim 2 in which the angle α comprises −9 degrees ≥α≥−25 degrees.

6. The non-transitory computer readable medium of claim 5 in which the angle α comprises −14 degrees.

7. A method comprising:
obtaining chromatic contrast sensitivity data representing multiple color encoding angles;
from the data, generating an ellipse around a first color center; and
from the ellipse, and using one or more multi-core processors, determining a signal encode direction, the signal encode direction comprising an angle α representing a negative angle between the 'a*' axis in an CIELAB space and a direction of minimum sensitivity of an encoded signal, in which the angle α comprises −9 degrees ≥α≥−25 degrees.

8. The method of claim 7 in which the ellipse comprises a 1 Just Noticeable Difference (JND) around the first color center.

9. The method of claim 7 further comprising transforming color artwork to include an encoded signal, said transforming utilizing the angle α and a vector length from the first color center to an ellipse boundary.

10. The method of claim 7 in which the chromatic contrast sensitivity data comprises visual observation data of the encoded signal.

11. The method of claim 7 in which the angle α comprises −14 degrees.

12. The method of claim 10 in which the transforming utilizes adjustment weights.

13. The method of claim 7 in which the encoded signal comprises a message signal and a synchronization signal.

14. The method of claim 13 in which the synchronization signal is utilized to resolve image distortion including rotation and scale.

15. The method of claim 7 further comprising determining a vector length from the first color center to an ellipse boundary in the angle α direction.

16. The method of claim 15 further comprising transforming color artwork to include an encoded signal, said transforming utilizing the angle α and the vector length.

17. A non-transitory computer readable medium comprising instructions stored therein that, when executed by one or more processors, cause the one or more processors to perform:
obtaining chromatic contrast sensitivity data representing multiple color encoding angles;
from the data, generating an ellipse around a first color center; and
from the ellipse, determining a signal encode direction, the signal encode direction comprising an angle a representing a negative angle between the 'a*' axis in an CIELAB space and a direction of minimum sensitivity of an encoded signal, in which the angle α comprises -9 degrees >α>-25 degrees.

18. The non-transitory computer readable medium of claim 17 in which the ellipse comprises a 1 Just Noticeable Difference (JND) around the first color center.

19. The non-transitory computer readable medium of claim 17 in which the instructions comprise instructions for transforming color artwork to include an encoded signal, said transforming utilizing the angle a and a vector length from the first color center to an ellipse boundary.

20. The non-transitory computer readable medium of claim 17 in which the chromatic contrast sensitivity data comprises visual observation data of signal encoding.

21. The non-transitory computer readable medium of claim 17 in which the angle α comprises -14 degrees.

22. The non-transitory computer readable medium of claim 20 in which the transforming utilizes adjustment weights.

23. The non-transitory computer readable medium of claim 17 in which the encoded signal comprises a message signal and a synchronization signal.

24. The non-transitory computer readable medium of claim 23 in which the synchronization signal is utilized to resolve image distortion including rotation and scale.

25. The non-transitory computer readable medium of claim 17 in which the instructions comprise instructions for determining a vector length from the first color center to an ellipse boundary in the angle α direction.

26. The non-transitory computer readable medium of claim 25 further comprising transforming color artwork to include an encoded signal, said transforming utilizing the angle α and the vector length.

* * * * *